US012773586B2

(12) United States Patent
Seebaluck et al.

(10) Patent No.: US 12,773,586 B2
(45) Date of Patent: Oct. 27, 2026

(54) UNIVERSAL VESSEL MOUNTING SYSTEM

(71) Applicant: Kidde Technologies Inc., Wilson, NC (US)

(72) Inventors: Len D. Seebaluck, Wake Forest, NC (US); Aaron S. Rogers, Surf City, NC (US)

(73) Assignee: Kidde Technologies, Inc., Wilson, NC (US)

( * ) Notice: Subject to any disclaimer, the term of this patent is extended or adjusted under 35 U.S.C. 154(b) by 303 days.

(21) Appl. No.: 18/545,009

(22) Filed: Dec. 19, 2023

(65) Prior Publication Data

US 2025/0195928 A1 Jun. 19, 2025

(51) Int. Cl.
*A62C 31/28* (2006.01)
*A62C 3/08* (2006.01)

(52) U.S. Cl.
CPC ................ *A62C 31/28* (2013.01); *A62C 3/08* (2013.01)

(58) Field of Classification Search
CPC ........... A62C 31/28; A62C 3/08; A62C 35/02; F17C 2205/0188; F17C 2221/011; F17C 2223/0123; F17C 2223/036; F17C 13/084; B60K 15/07; B60K 15/067; B64D 37/02; B60P 7/0823
USPC ............................................................ 410/97
See application file for complete search history.

(56) References Cited

U.S. PATENT DOCUMENTS 3,416,762 A 12/1968 Headrick
7,216,721 B2 5/2007 Jacobson et al.
2005/0249568 A1 11/2005 Gormly et al.
2011/0174856 A1 7/2011 Hayashi et al.
2013/0078049 A1* 3/2013 Bistuer .................... B64D 9/00 410/97
2017/0313434 A1 11/2017 Peryea et al.
2021/0094461 A1 4/2021 Miller
2022/0048425 A1* 2/2022 Carrillo Catalan ... B60P 7/0853
2022/0371505 A1* 11/2022 Bastien ...................... B62J 7/08
2023/0000697 A1 1/2023 Geliot et al.

FOREIGN PATENT DOCUMENTS

CN 111186577 A 5/2020
CN 112237698 A 1/2021
DE 202016102046 U1 6/2016

OTHER PUBLICATIONS

Extended European Search Report for EP Application No. 24220967.4, dated Apr. 7, 2025, 11 pages.

* cited by examiner

*Primary Examiner* — Steven M Sutherland
(74) *Attorney, Agent, or Firm* — Kinney & Lange, P.A.

(57) ABSTRACT

A vessel mounting system for a vehicle includes a first flexible strap configured to circumscribe the vessel in a first direction, a second flexible strap configured to circumscribe the vessel in a second direction such that the second flexible strap and the first flexible strap overlap in at least one location, a strap mating coupler securing the first flexible strap to the second flexible at the at least one location, and at least one coupling device connected to the first flexible strap configured to mate with a structure on the vehicle. Each of the first flexible strap and the second flexible strap includes a plurality of clamp sleeves connected in an end-to-end manner.

17 Claims, 4 Drawing Sheets

UNIVERSAL VESSEL MOUNTING SYSTEM

BACKGROUND

The present invention relates to a mounting system for vehicle-borne vessels, and more particularly to a mounting system for aviation fire extinguisher vessels.

Aviation fire extinguisher vessels are traditionally mounted to aircraft structures using secondary mounting plates and vessel-attached mounting lugs. Although considered suitable for the intended purpose, in such mounting systems, the vessel-attached lugs bear a majority of the vessel's weight. Furthermore, the mounting hardware can require the vessel to be oriented at a non-optimal discharge angle. As such, improved mounting systems are desirable.

SUMMARY

A vessel mounting system for a vehicle includes a first flexible strap configured to circumscribe the vessel in a first direction, a second flexible strap configured to circumscribe the vessel in a second direction such that the second flexible strap and the first flexible strap overlap in at least one location, a strap mating coupler securing the first flexible strap to the second flexible at the at least one location, and at least one coupling device connected to the first flexible strap configured to mate with a structure on the vehicle. Each of the first flexible strap and the second flexible strap includes a plurality of clamp sleeves connected in an end-to-end manner.

A method of mounting a vessel to a structure in a vehicle using a mounting system includes circumscribing the vessel with a first flexible strap in a first direction along the vessel, circumscribing the vessel with a second flexible strap in a second direction non-parallel to the first direction, and connecting at least one coupling device extending from the first flexible strap to a structure of the vehicle.

Figure 1A:
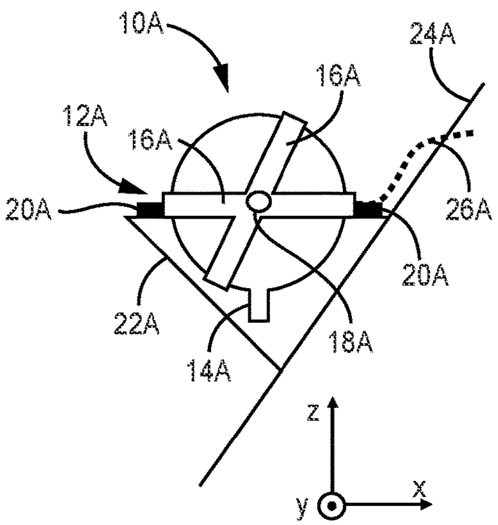
FIG. 1A is a simplified illustration of a first vessel supported by a first mounting system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Federal aviation regulations require fire extinguishers and fixed fire systems throughout an aircraft. However, traditional halon-based systems are being phased out in favor of low or zero ODP (ozone depletion potential) agents. Such agents often require larger, heavy vessels than halon. Furthermore, some new aircraft designs have fewer load-bearing structures to which vessels can be attached. Accordingly, the disclosure presents a universal mounting system for use with various fire suppression vessels in both existing and future aircraft designs, as the mounting systems are highly customizable to the vessel. It is worth noting that the mounting systems described herein need not be limited to aviation and/or fire suppression applications, for example, with utility in other types of vehicles (e.g., marine, terrestrial, etc.), as well as non-fire extinguishing pressure vessels, such as oxygen tanks for an aircraft's oxygen system, and/or the compressed gas cylinders used for inflating escape slides.

FIGS. 1A and 2B are simplified illustrations showing, respectively, vessel 10A supported by mounting system 12A and vessel 10B supported by mounting system 12B. Vessel 10A is a spherical pressure vessel and vessel 10B is a cylindrical pressure vessel, each of which can contain one or a combination of fire extinguishing/suppressing agents. Such agents can be expelled from outlet nozzles 14A, 14B, which are preferably disposed at the gravitational bottom of vessels 10A and 10B, respectively, when mounted to permit optimal discharge of the agent(s) when activated.

Mounting system 12A can include at least two flexible support straps 16A, each of which can be adjustable to circumscribe vessel 10A in the desired direction, as is discussed in greater detail below. At least one strap mating coupler 18A releasably secures straps 16A to one another in at least one overlapping location of straps 16A. Lugs 20A can be attached to strap 16A to support vessel 10A upon and attach to bracket 22A, which can be an aircraft-based structure attached to bulkhead 24A, or other load-bearing structure (e.g., rail, column, etc.). In some existing mounting systems, lugs are attached to the vessel, (e.g., via welding), and the weight of the vessel is borne upon the lugs as concentrated point loads. Over time, these point loads can compromise the vessel's integrity (e.g., causing cracks at the welds), causing damage and/or rendering the vessel inoperable. However, in system 12A, lugs 20A are attached to strap 16A, such that these loads are not placed on vessel 10A. Furthermore, the combinations of lugs 20A and multiple interconnected straps 16A supports vessel 10A in each of the x, y, and z directions, thereby distributing the loads and reducing the vessel fatigue risk. Adapting system 12A such that lugs 20A are attached to straps 16A instead of fixed points on vessel 10A allows vessel 10A to be optimally restrained to the surrounding aircraft structure. Vessel 10A can therefore be designed with minimal wall thickness (thereby minimizing weight) based on its size and the type of agent contained within, since it need not have welds for attachment of lugs 20A. Finally, should any lug 20A be damaged, it can easily be replaced with no loss of functionality of the more expensive vessel 10A.

Mounting system 12B is substantially similar to mounting system 12A, having one or more straps 16B circumscribing vessel 10B, strap mating coupler(s) 18B, lugs 20B attached to the horizontally disposed (i.e., along the x-axis) strap 16B to support vessel 10B upon bracket 22B which is attached to bulkhead 24B. System 12B differs slightly in that, because of the additional bracket 22B above vessel 10B, a lug 20B is also attached to the vertically extending strap 16B to secure vessel 10B to the second bracket 22B. Such lug 20B can alternatively be a hook in another embodiment. System 12B also supports 10B in each of the x, y, and z directions.

It is also worth mentioning that straps 16A and 16B can be disposed about vessels 10A and 10B, respectively, without obstructing nozzles 14A or 14B, and further permitting the optimal orientation of vessels 10A and 10B with nozzles 14A and 14B at the respective gravitational bottoms. It is further worth mentioning that in some embodiments, grounding wires 26A and 26B can be connected to a component of system 12A and 12B, respectively, to electrically connect vessels systems 12A and 12B to a grounding point on the aircraft.

Figure 2:
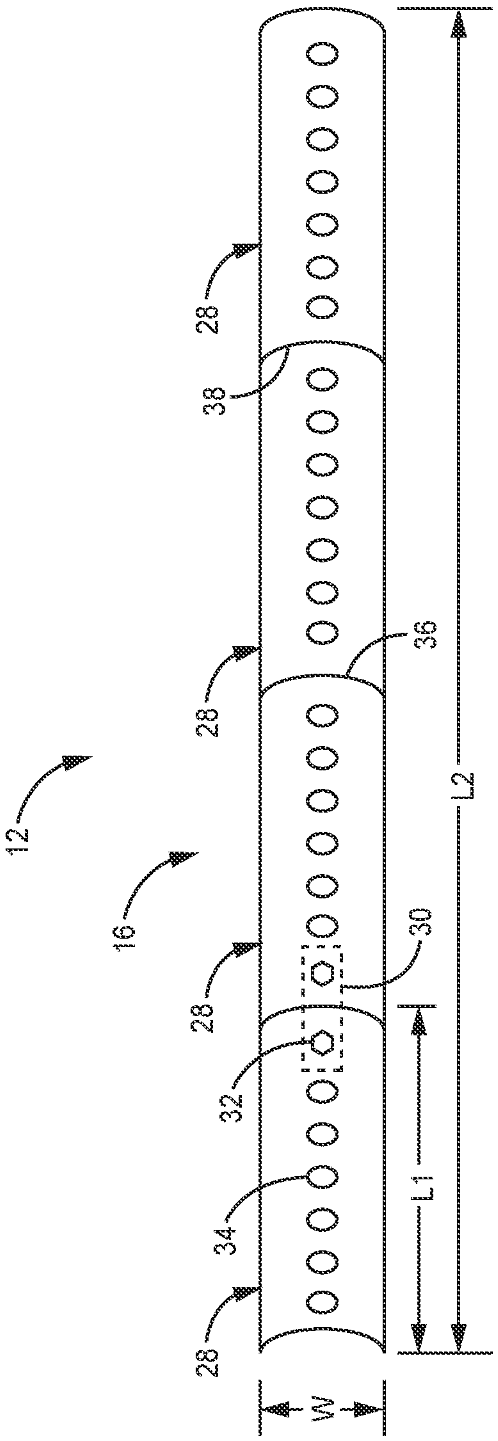
FIG. 2 is a simplified illustration of a flexible strap belonging to a mounting system, such as the mounting systems of FIGS. 1A and 1B.

FIG. 2 is a simplified illustration showing strap 16 of mounting system 12, which can be substantially similar to straps 16A and 16B of mounting systems 12A and 12B, respectively, as described above. Strap 16 can be formed from multiple clamp sleeves 28, each which can be arranged in an end-to-end manner and attached to each neighboring clamp sleeve 28 using track coupler 30 (represented in transparency by dashed lines) and bolts 32. Each clamp sleeve 28 includes a number of holes 34 extending completely through, in most cases, the thickness of clamp sleeve 28. Holes 34 can be used to interconnect various couplers to a respective clamp sleeve 28, as is discussed in greater detail below. Each clamp sleeve 28 can further have a length L1 and a width W. Length L1 can generally range from 2 in (50.8 mm) to 12 in (304.8 mm), and can more specifically be 2 in, 3 in (76.2 mm), or 6 in (152.4 mm) in some embodiments. In general, any number from two to n clamp sleeves 28 of uniform or varied lengths L1 can be attached to form a strap 16 with the desired overall length L2 of strap 16. Width W can nominally be 2 in, but greater widths (e.g., 3 in) can be used with larger and/or heavier vessels. Each clamp sleeve 28 can have opposing first and second ends 36 and 38, and more specifically, concave end 36 and a convex end 38, with concave end 36 being configured to mate with a convex end 38 of an adjacent clamp sleeve 28, and convex end 38 being configured to mate with a concave end 38 of another adjacent clamp sleeve 28. Further, strap 16 can be made to fully circumscribe a vessel (e.g., 10A or 10B) by mating the concave end 36 of one outermost clamp sleeve 28 to the convex end of the opposing outermost clamp sleeve 28, such that strap 16 forms an enclosed loop. End 36 and/or 38 can be straight or have some kind of male-female configuration in alternative embodiments.

Figure 3:
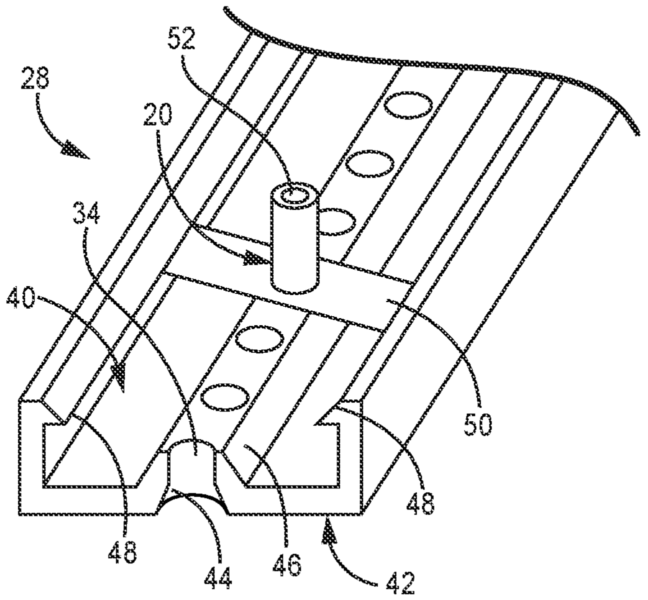
FIG. 3 is a perspective cross-sectional view of a clamp sleeve belonging to the flexible strap of FIG. 2.

FIG. 3 is a perspective cross-sectional view of a portion of an individual clamp sleeve 28 showing first, external (i.e., outward facing) side 40 in greater detail. Clamp sleeve 28 can be formed from a lightweight flexible material such as a metallic material (e.g., steel) or a composite material (e.g., Kevlar). Second, internal (i.e., vessel facing) side 42 can be generally planar/flat and can include countersinks (or counterbores) 44 aligned with respective holes 34, allowing the various fasteners (e.g., bolts 32, lugs 20. etc.) to sit inward of the surface of internal side 42. This is preferable to prevent contact between the fasteners and the supported vessel (e.g., 10A or 10B). Internal side 42 can further include a polymeric coating to create friction between the vessel and internal side 42 for a secure fit between strap 16 and the vessel.

External side 40 includes longitudinally extending boss region 46 in which holes 34 are formed. External side 40 further includes a longitudinally extending lip 48 on each side of boss region 46. Lips 48 and boss region 46 cooperate to retain various mounting hardware. For example, FIG. 3 shows lug coupler 50 and lug 20 (substantially similar to lugs 20A and 20B) connected to clamp sleeve 28. Lug coupler 50 can be inserted into external side 40 such that it overlaps with and is retained by lips 48. Lug coupler 50 includes a hole (shown and labeled in FIG. 4) which is aligned with a desired hole 34 in clamp sleeve 28 at a location where strap 16 is expected to meet with an aircraft structure (e.g., bracket 22A or 22B) so that lug 20 can be inserted to mate with the aircraft structure. Accordingly, lug 20 can include hole 52 which can be aligned with a hole in the aircraft structure, and through which a fastener can be inserted.

Figure 4:
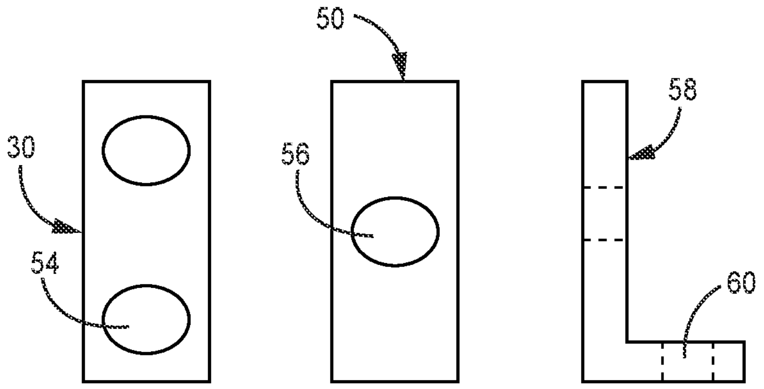
FIG. 4 is a simplified illustration of mounting hardware of a mounting system, such as the mounting system of FIGS. 1A and 1B.

FIG. 4 is a simplified illustration of various mounting hardware that can be used with clamps sleeves 28. Beginning from the left is track coupler 30 (also shown in FIG. 2) used to couple two clamp sleeves 28. Track coupler 30 is planar with at least two holes 54, one of each aligning with a hole 34 on each clamp sleeve 28 for receiving bolts 32. At the center is lug coupler 50 which is similarly planar and has at least one hole 56 for aligning with a hole 34 of clamp sleeve 28 and through which lug 20 or other suitable coupling device can be inserted. On the right is an L-shaped bracket 58 having holes 60, one of which can align with a hole 34 on clamps sleeve 28 and the other of which can align with a hole on the external mounting structure. Bracket 58 can be used in addition to, or instead of lug coupler 50 and lug 20 depending on the type and/or position of external support structure available. Bracket 58 need not be L-shaped in an alternative embodiment. Track coupler 30, lug coupler 50, and bracket 58 can all be formed from a metallic material (e.g., stainless steel).

Figure 1B:
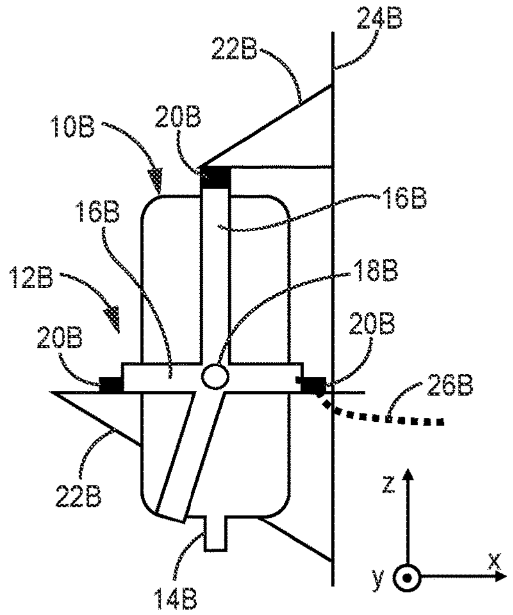
FIG. 1B is a simplified illustration of a second vessel supported by a substantially similar second mounting system.

Mounting system 12 can be packaged as a kit including multiple clamp sleeves 28 of various lengths, multiple track couplers 30 and bolts 32 (including matching nuts and washers), multiple lug couplers 50 and lugs 20, multiple brackets 58, multiple strap mating couplers (shown in FIGS. 1A and 1B as 18A and 18B), and at least one grounding wire (shown in FIGS. 1A and 1B as 26A and 26B). To assemble mounting system 12, the user can, from such a kit, select the desired number and length of clamp sleeves 28 needed to circumscribe a particular vessel in one direction. The selected clamps sleeves 28 can be assembled end-to-end using track couplers 30 and bolts 32 to form a strap 16. Lug couplers 50 with lugs 20 and/or brackets 58 can be attached to clamp sleeves 28 wherever the respective strap 16 needs to interface with/attach to an external support structure. At least one additional strap 16 can be similarly assembled and sized to circumscribe the vessel in a different (i.e., non-parallel) direction. In some cases, the straps will have different lengths (i.e., L2 of FIG. 2), such as with a vessel longer in one direction (e.g., vessel 10B of FIG. 1B). Straps 16 can then be secured around the vessel by securing together the free ends 36, 38 of each strap 16. Straps 16 can then be secured together at overlapping points using strap mating couplers. The various lugs 20 and/or brackets 58 can then be used to secure the vessel to the external support structure of the aircraft. System 12 can be applied to different vessel configurations and is not unique to a single vessel mounting configuration. Thus, the vessel installers/maintainers can utilize the common mounting kits for multiple different vessel configurations to permit economic installations that are significantly cost reduced and stronger than the current vessel fixed lug mounting approaches.

Discussion of Possible Embodiments

The following are non-exclusive descriptions of possible embodiments of the present invention.

A vessel mounting system for a vehicle includes a first flexible strap configured to circumscribe the vessel in a first direction, a second flexible strap configured to circumscribe the vessel in a second direction such that the second flexible strap and the first flexible strap overlap in at least one location, a strap mating coupler securing the first flexible strap to the second flexible at the at least one location, and at least one coupling device connected to the first flexible strap configured to mate with a structure on the vehicle. Each of the first flexible strap and the second flexible strap includes a plurality of clamp sleeves connected in an end-to-end manner.

The mounting system of the preceding paragraph can optionally include, additionally and/or alternatively, any one or more of the following features, configurations and/or additional components:

In the above mounting system, each of the plurality of clamps sleeves can include a first side including a longitudinally extending boss region and a lip on each side of the boss region, and an opposing side. A plurality of holes can extend through the boss region from the first side to the second side.

Any of the above mounting systems can further include one of a plurality of countersinks in the second side aligning with respective ones of the plurality of holes, and a plurality of counterbores in the second side aligning with respective ones of the plurality of holes.

Any of the above mounting systems can further include a first track mating coupler connecting a first of the plurality of clamp sleeves to a second of the plurality of clamp sleeves, the coupler having a first hole aligned with a hole of the first clamp sleeve and a second hole aligned with a hole of the second clamp sleeve, and a bolt extending through each of the first hole and the second hole.

Any of the above mounting systems can further include a second track mating coupler connecting a third of the plurality of clamp sleeves to the second of the plurality of clamp sleeves, the coupler having a first hole aligned with a hole of the second clamp sleeve and a second hole aligned with a hole of the third clamp sleeve, and a bolt extending through each of the first hole and the second hole.

In any of the above mounting systems, the coupling device connected to the first flexible strap can be a lug.

Any of the above mounting systems can further include a planar lug coupler extending across the boss region and retained by each lip. A hole in the lug coupler can align with one of the plurality of holes in the clamp sleeve, and the lug can extend through the one of the plurality of holes in the clamp sleeve and the hole in the lug coupler.

Any of the above mounting systems can further include at least one additional coupling device connected to the first flexible strap or the second flexible strap and configured to mate with a structure on the vehicle.

In any of the above mounting systems, the at least one additional coupling device can be a lug.

In any of the above mounting systems, the at least one additional coupling device can be a bracket.

In any of the above mounting systems, each of the plurality of clamp sleeves can be formed from one of a metallic material and a composite material.

In any of the above mounting systems, each of the plurality of clamp sleeves can further include a polymeric material on the second side.

In any of the above mounting systems, the first direction of the first flexible strap can be non-parallel to the second direction of the second flexible strap.

In any of the above mounting systems, the first flexible strap can have a first length, and the second flexible strap can have a second length.

In any of the above mounting systems, the first length can be different than the second length.

A method of mounting a vessel to a structure in a vehicle using a mounting system includes circumscribing the vessel with a first flexible strap in a first direction along the vessel, circumscribing the vessel with a second flexible strap in a second direction non-parallel to the first direction, and connecting at least one coupling device extending from the first flexible strap to a structure of the vehicle.

The method of the preceding paragraph can optionally include, additionally and/or alternatively, any one or more of the following features, configurations and/or additional steps:

Any of the above methods can further include assembling each of the first flexible strap and the second flexible strap by connecting a plurality of clamp sleeves in an end-to-end manner.

Any of the above methods can further include securing the first flexible strap to the second flexible strap in at least one overlapping location using a strap mating coupler.

In any of the above methods, the first flexible strap can have a first length, and the second flexible strap can have a second length.

In any of the above methods, the first length can be different than the second length.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A vessel mounting system for a vehicle, the vessel mounting system comprising:

a first flexible strap configured to circumscribe a vessel in a first direction;

a second flexible strap configured to circumscribe the vessel in a second direction such that the second flexible strap and the first flexible strap overlap in at least one location;

a strap mating coupler securing the first flexible strap to the second flexible strap at the at least one location; and at least one coupling device connected to the first flexible strap configured to mate with a structure of the vessel mounting system on the vehicle, wherein each of the first flexible strap and the second flexible strap comprises:

a plurality of clamp sleeves connected in an end-to-end manner by a first track mating coupler connecting a first of the plurality of clamp sleeves to a second of the plurality of clamp sleeves, the first track mating coupler having a first hole aligned with a hole of a first clamp sleeve and a second hole aligned with a hole of a second clamp sleeve, and a bolt extending through each of the first hole and the second hole;

wherein each of the plurality of clamp sleeves comprises:

a first side comprising:

a longitudinally extending boss region;

a lip on each side of the longitudinally extending boss region; and an opposing second side, wherein a plurality of holes extend through the longitudinally extending boss region from the first side to the opposing second side.

2. The vessel mounting system of claim 1 further comprising one of:

a plurality of countersinks in the opposing second side aligning with respective ones of the plurality of holes; and a plurality of counterbores in the opposing second side aligning with respective ones of the plurality of holes.

3. The vessel mounting system of claim 1 further comprising:

a second track mating coupler connecting a third of the plurality of clamp sleeves to the second of the plurality of clamp sleeves, the coupler having a first hole aligned with a hole of the second clamp sleeve and a second hole aligned with a hole of the third clamp sleeve; and a bolt extending through each of the first hole and the second hole.

4. The vessel mounting system of claim 1, wherein the at least one coupling device connected to the first flexible strap is a lug.

5. The vessel mounting system of claim 4 further comprising:

a planar lug coupler extending across the longitudinally extending boss region and retained by each lip, wherein a hole in the planar lug coupler aligns with one of the plurality of holes in one of the plurality of clamp sleeves; and wherein the planar lug extends through the one of the plurality of holes in one of the plurality of clamp sleeves and the hole in the lug coupler.

6. The vessel mounting system of claim 5 further comprising:

at least one additional coupling device connected to the first flexible strap or the second flexible strap and configured to mate with a structure on the vehicle.

7. The vessel mounting system of claim 6, wherein the at least one additional coupling device is a lug.

8. The vessel mounting system of claim 6, wherein the at least one additional coupling device is a bracket.

9. The vessel mounting system of claim 1, wherein each of the plurality of clamp sleeves is formed from one of:

a metallic material; and a composite material.

10. The vessel mounting system of claim 9, wherein each of the plurality of clamp sleeves further comprises:

a polymeric material on the second side.

11. The vessel mounting system of claim 1, wherein the first direction of the first flexible strap is non-parallel to the second direction of the second flexible strap.

12. The vessel mounting system of claim 1, wherein the first flexible strap has a first length, and wherein the second flexible strap has a second length.

13. The vessel mounting system of claim 12, wherein the first length is different than the second length.

14. A method of mounting a vessel to a structure in a vehicle using a mounting system, the method comprising:

circumscribing the vessel with a first flexible strap in a first direction along the vessel;

circumscribing the vessel with a second flexible strap in a second direction non-parallel to the first direction;

assembling each of the first flexible strap and the second flexible strap by connecting a plurality of clamp sleeves in an end-to-end manner, wherein each of the plurality of clamp sleeves comprises:

a first side comprising:

a longitudinally extending boss region;

a lip on each side of the longitudinally extending boss region; and an opposing second side, wherein a plurality of holes extend through the longitudinally extending boss region from the first side to the opposing second side; and connecting at least one coupling device extending from the first flexible strap to a structure of the vehicle.

15. The method of claim 14 further comprising: securing the first flexible strap to the second flexible strap in at least one overlapping location using a strap mating coupler.

16. The method of claim 14, wherein the first flexible strap has a first length, and wherein the second flexible strap has a second length.

17. The method of claim 16, wherein the first length is different than the second length.

* * * * *